United States Patent [19]

Portoulas

[11] 3,711,634

[45] Jan. 16, 1973

[54] CHROMA-BURST SEPARATOR AND AMPLIFIER CIRCUIT

[75] Inventor: Panayiotis G. Portoulas, Chicago, Ill.

[73] Assignee: Warwick Electronics Inc.

[22] Filed: Oct. 18, 1971

[21] Appl. No.: 190,038

[52] U.S. Cl.........................178/5.4 SY, 178/69.5 CB

[51] Int. Cl.................................................H04n 9/46

[58] Field of Search.........178/5.4 R, 5.4 SY, 69.5 CB

[56] References Cited

UNITED STATES PATENTS

| | | | |
|---|---|---|---|
| 3,469,022 | 9/1969 | Iannuzzi | 178/5.4 SY |
| 3,604,843 | 9/1971 | Harwood et al. | 178/69.5 CB |

*Primary Examiner*—Richard Murray

*Attorney*—Hofgren, Wegner, Allen, Stellman & McCord

[57] ABSTRACT

A combined separator/amplifier for deriving chroma and burst signals comprises a differential amplifier having a pair of differentially acting transistors coupled to a common current source. The current source is formed by a transistor driven by unseparated chroma and burst information from a composite color television signal. Bias networks force one differential transistor to be normally conductive and the other differential transistor to be normally nonconductive. An amplified chroma signal is available at the collector of the normally conductive transistor. During retrace, a single flyback pulse drives the differential transistors into their opposite conduction states, causing an amplified burst signal to be available at the collector of the normally nonconductive transistor. The circuit includes automatic chroma control and color killer action.

9 Claims, 2 Drawing Figures

CHROMA-BURST SEPARATOR AND AMPLIFIER CIRCUIT

BACKGROUND OF THE INVENTION

This invention relates to a combined separator and amplifier circuit used in a color television receiver for deriving separate, amplified burst and chroma signals.

In a color television receiver, a separator and amplifier circuit is necessary to derive burst and chroma signals from a composite color television signal. Circuits are known which combine the function of a separator and an amplifier into a single stage. Typically, such circuits require a pair of flyback pulses to separately and alternately enable a burst channel and a chroma channel. For example, it has been known to drive a split-pentode vacuum tube with a pair of opposite going flyback pulses in order to alternately enable and disable chroma and burst channels connected to the pair of plates of the pentode.

Prior combined separator/amplifier circuits for deriving chroma and burst signals have a number of disadvantages. Some circuits require two flyback pulses of different polarity. Also such prior circuits have not been suitable for incorporation into linear integrated circuits. In addition, these circuits have been relatively complex, and not readily adapted for use with automatic chroma control and color killer action.

SUMMARY OF THE INVENTION

In accordance with the present invention, an improved separator/amplifier circuit uses a single differential amplifier to derive separate, amplified burst and chroma signals. Only a single flyback pulse is required to operate the circuit, and automatic chroma control and color killer action can easily be added with no increase in components or complexity. The circuit is readily adapted to linear integrated circuit techniques, and is of simple design and straightforward operation.

One object of this invention is to provide an improved chrominance and burst separating and amplifying circuit which operates as a differential amplifier.

Further objects and features of the invention will be apparent from the following description, and from the drawings.

DESCRIPTION OF THE PREFERRED EMBODIMENT

Figure 1:
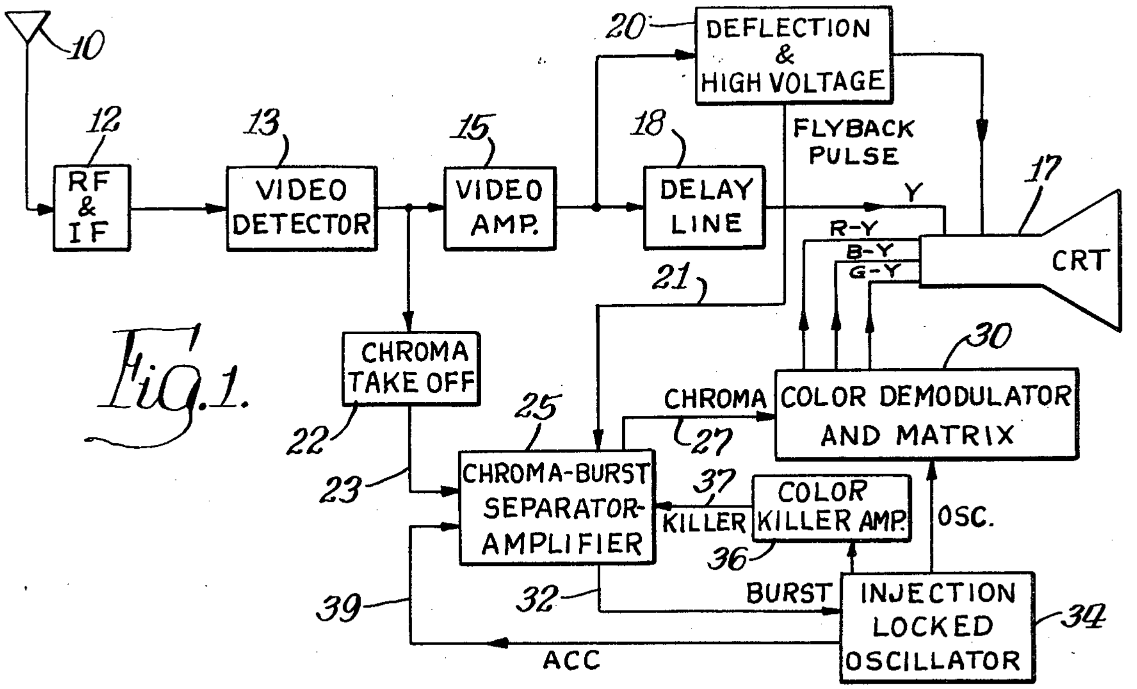
FIG. 1 is a block diagram of a color television receiver incorporating a novel chroma and burst separator and amplifier.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

Turning to FIG. 1, a color television receiver is illustrated in which an incoming composite color television signal is received by an antenna 10 and coupled to conventional RF and IF amplifying stages 12. The amplified IF signal is coupled to a video detector 13 in order to reproduce the modulating video information which includes a luminance or Y signal, a chrominance or chroma signal modulated on a 3.58 megahertz carrier, and a 3.58 megahertz burst signal which is transmitted during the blanking interval for each scanning line.

A video amplifier 15 amplifies the luminance or Y signal and couples it to a tri-color cathode ray tube or CRT 17 through a delay line 18. A deflection and high voltage circuit 20, responsive to the output of video amplifier 15, derives the horizontal and vertical scanning signals for CRT 17. During the retrace time period, a flyback pulse for blanking the video display is generated from the horizontal output transformer in circuit 20, and appears on a line 21.

Figure 2:
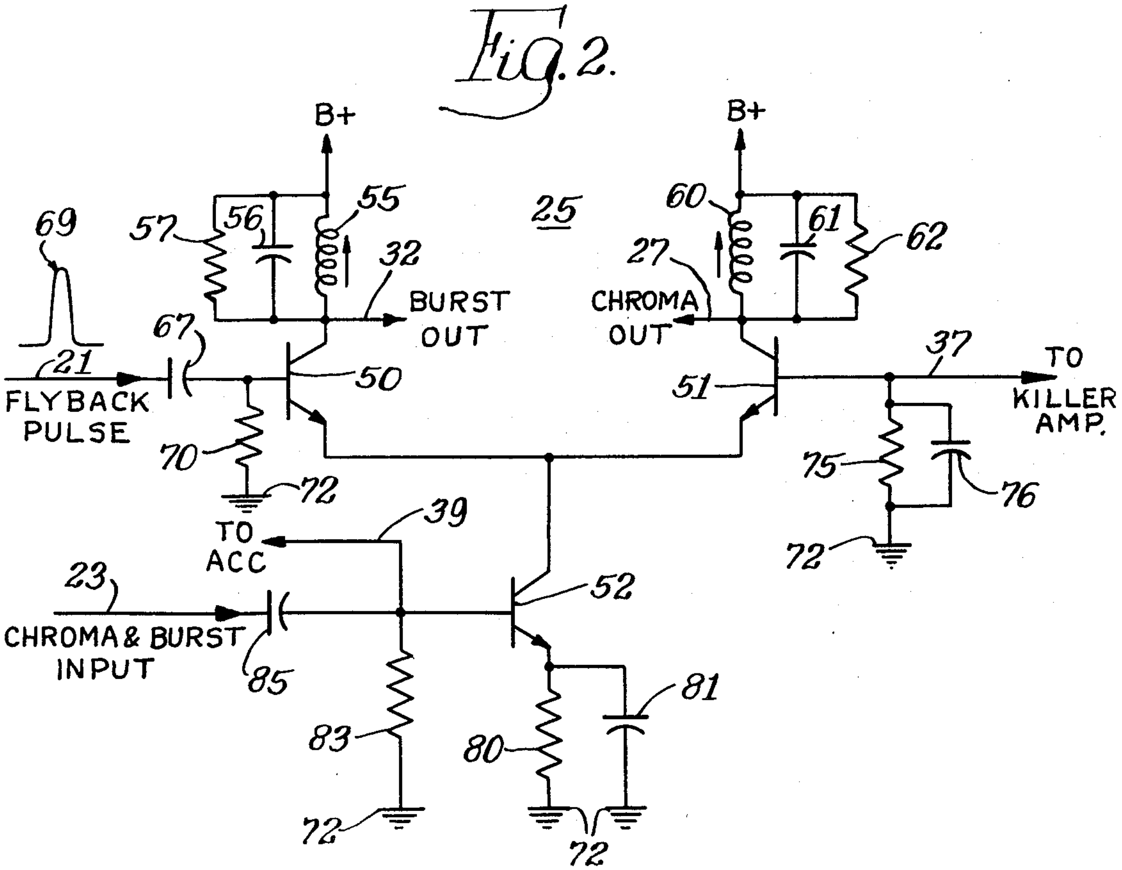
FIG. 2 is a schematic diagram of the chroma and burst separator and amplifier shown in block form in FIG. 1.

The chroma information signal modulated on the 3.58 megahertz carrier, and the 3.58 megahertz burst signal, is coupled through a chroma take-off circuit 22, such as a chroma bandpass filter, and via output line 23 to the applicant's novel combined chroma and burst separator/amplifier 25, shown in detail in FIG. 2. Circuit 25 provides, on a chroma output line 27, a separated and amplified chroma signal which is coupled to a color demodulator and matrix 30 in order to derive three color difference signals R–Y, B–Y, and G–Y for driving the CRT 17. Circuit 25 also has a burst output line 32 on which an amplified burst reference signal is coupled to a conventional injection locked oscillator 34 which generates oscillatory signals coupled to the color demodulator and matrix 30 for the purpose of demodulating the chroma signal.

The injection locked oscillator 34 also generates, during reception of a black-and-white transmission, a color killer signal which is coupled to a color killer amplifier 36. Amplifier 36 has an output line 37 which couples a color killer voltage to the circuit 25. In addition, oscillator 34 further generates an automatic chroma control or ACC voltage, on an output line 39, which is coupled to circuit 25. While the color killer and ACC signals have been illustrated as being derived from an injection locked oscillator, it will be appreciated that any conventional circuit may be used to derive these signals. By way of reference, a suitable injection locked oscillator which derives color killer and ACC voltages is shown in U.S. Pat. No. 2,982,812, issued May 2, 1961 to R. N. Rhodes et al.

In the block diagram of the color television receiver, certain additional circuits of known construction have not been illustrated, as they are not necessary for an understanding of the present invention. Other conventional arrangements for a color television receiver can be utilized, as desired. For example, the chroma take-off circuit 22 may include cascaded video amplifiers having an output directly coupled to the circuit 25. In such an event, the necessary bandpass filters would be added to the circuit 25, rather than being located in block 22.

In FIG. 2, the novel combined chroma and burst separator/amplifier circuit 25 is illustrated in detail. The circuit comprises a single differential amplifier having a pair of NPN transistors 50 and 51 coupled to a common current source formed by a third NPN transistor 52. The emitter electrodes of both transistors 50 and 51 are tied together and are in common with the collector electrode of transistor 52. The collector electrode of transistor 50 is coupled through a tuned tank consisting in parallel of an inductor 55, a capacitor 56, and a resistor 57 located between the collector electrode and a source of B+ voltage, such as 35 volts DC. The junction between the tank and the collector electrode of transistor 50 forms the burst output line 32. The collector electrode of transistor 51 is connected to a similar tuned tank consisting in parallel of an inductor 60, capacitor 61, a resistor 62 located between the collector electrode and the same source of B+. The chroma output line 27 is located between the tank and the collector electrode of transistor 51.

In order to bias the pair of transistors 50 and 51 in a differential or alternate manner, the base electrode of transistor 50 is connected through a coupling capacitor 67 to the flyback pulse line 21 which has, during retrace time, a positive going flyback pulse 69 thereon having a peak amplitude of 10 volts. The base electrode of transistor 50 is also coupled through a resistor 70 to a source of reference potential or ground 72. The base electrode of transistor 51 is coupled to ground 72 through the parallel combination of a resistor 75 and a capacitor 76. The base electrode is also directly coupled to the color killer amplifier output line 37.

Common current source transistor 52 has its emitter electrode coupled to ground 72 through a parallel resistor 80 and capacitor 81. The base electrode of transistor 52 is similarly shunted to ground 72 through a resistor 83, and is coupled to the chroma and burst input line 23 through a coupling capacitor 85. The ACC output line 39 is directly connected to the base electrode of transistor 52.

In operation, the bias voltages are selected to cause transistor 51 to be normally conductive and thereby amplify the chroma information signal. When the positive going flyback pulse 69 is applied to the base of transistor 50, it drives transistor 50 into conduction. Since transistors 50 and 51 operate as a differential pair, the conduction of transistor 50 drives transistor 51 to cut-off, thereby terminating the chroma output signal on the chroma output line 27. At the same time, the signal from the current source 52, which now consists of burst information, is amplified by the conducting transistor 50 and appears on the burst output line 32.

The differential amplifier including current source 52 is very suitable for incorporation into a linear integrated circuit. By using a simple differential amplifier, the burst is separated from the chroma, and both signals are separately amplified. In one embodiment which was constructed, the gain of the chroma channel including transistor 51 was approximately 13, and the gain of the burst channel including transistor 50 was approximately 16.

The gains of transistors 50 and 51, and therefore the resulting collector currents, can be varied by controlling the base bias of transistor 52. Therefore, automatic chroma control (ACC) can readily be provided by applying to the base of transistor 52, via ACC output line 39, a voltage proportional to the burst amplitude. Since the burst amplitude is also varied, a closed loop ACC circuit is formed.

Color killer action is provided by coupling a negative cut-off or back bias to the base-emitter semiconductor junction of transistor 51, in the absence of burst. Such a negative cut-off voltage is available on the killer output line 37 from the color killer amplifier.

If closed loop ACC was not desired, the connection of output line 39 to the base of transistor 52 can be replaced with a resistor (not illustrated) coupled to a B+ source. If the B+ source had a DC voltage of 35 volts, for example, then the replacement resistor could have a value of 12 kilohms, and the resistor 83 could have a value of 560 ohms. If color killer action was not desired, the output line 37 coupled to the base of transistor 51 can be replaced with a resistor (not illustrated) coupled to the same B+ source. Again, if the B+ source had a DC value of 35 volts, then the replacement resistor could have a value of 220 kilohms, and the resistor 75 could have a value of 33 kilohms. The last named resistors form a voltage divider which bias transistor 51 normally into conduction. This in turn drives transistor 50, in which resistor 70 could have a value of 33 kilohms, into nonconduction in the absence of a flyback pulse. When color killer and ACC are to be incorporated in the circuit 25, then the color killer amplifier and the source of the ACC signal, respectively, should be construed to provide the same biasing as described above.

Circuit 25 can be modified in various ways without departing from the present invention. For example, the circuit could be connected so that the flyback pulse was coupled to transistor 51 in order to drive it nonconductive, rather than the illustrated circuit in which the flyback pulse is coupled to transistor 50 in order to drive it conductive. Similarly, the flyback pulse can be coupled to either the base or emitter of transistors 50 and 51, with a polarity to either forward bias or reverse bias, respectively, the base-emitter semiconductor junction in each transistor 50 and 51. Other changes will be apparent to those skilled in the art.

I claim:

1. In a color television receiver for receiving a composite color television signal including a color reference burst signal and a chroma information signal, said burst signal and said chroma signal occurring at different points in time, a circuit for separating and amplifying both said burst signal and said chroma signal, comprising:

a differential amplifier comprising a first amplifying means and a second amplifying means, each amplifying means having a first electrode, a second electrode, and an output electrode, means connecting in common said first electrodes, and means separately coupling the output electrodes of said first amplifying means and said second amplifying means to a source of operating potential;

common means for coupling both said burst signal and said chroma signal to the commonly connected first electrodes of said first and second amplifying means;

bias means for differentially biasing said amplifying means to cause said second amplifying means to conduct and said first amplifying means to be substantially nonconductive; and control means for coupling a control signal to one electrode of one of said amplifying means to cause said first amplifying means to conduct and said second amplifying means to be substantially nonconductive during the time when said color reference burst signal is present, whereby an amplified chroma signal is produced at the output electrode of said second amplifying means and an amplified burst signal is produced at the output electrode of said first amplifying means.

2. The circuit of claim 1 wherein said common means comprises a third amplifying means having a first electrode, a second electrode, and an output electrode, means coupling said output electrode of said third amplifying means to said commonly connected first electrodes of said first amplifying means and said second amplifying means, means coupling one of said first and second electrodes of said third amplifying means to a reference potential, and means coupling the other of said first and second electrodes of said third amplifying means to a source of said burst signal and said chroma signal, whereby said common means forms a common current source for said first and second amplifying means.

3. The circuit of claim 2 including ACC means for developing a control signal for automatic chroma control of the color television receiver, and means coupling said control signal to said third amplifying means to control the current flow therethrough in proportion to said control signal.

4. The circuit of claim 2 wherein said first amplifying means and said second amplifying means each comprise a transistor having emitter, base, and collector electrodes corresponding to said first, second, and output electrodes, respectively, said common connecting means and said bias means causing said transistors to form a common emitter driven, differential operating amplifier.

5. The circuit of claim 4 wherein said third amplifying means comprises a transistor having emitter, base and collector electrodes corresponding to said first, second and output electrodes, respectively, whereby the collector electrode of said third amplifying means drives the emitter electrodes of said first and second amplifying means.

6. The circuit of claim 1 including a source of color killer signal generated when the color television receiver is receiving a black-and-white transmission, and said bias means includes means responsive to said color killer signal for biasing the differential amplifying means to cause said second amplifying means to be substantially nonconductive.

7. The circuit of claim 6 wherein said second amplifying means includes a semiconductor junction, and said color killer signal responsive means couples said color killer signal to the semiconductor junction with a polarity to back bias the semiconductor junction.

8. The circuit of claim 1 including deflection and high voltage means in said color television receiver for generating a flyback pulse occurring when said color reference burst signal is present, and said control means couples the flyback pulse to one of the first and second amplifying means to cause said differential amplifier to switch conduction states, said flyback pulse corresponding to said control signal.

9. The circuit of claim 8 wherein said first amplifying means includes a semiconductor junction, and said control means couples said flyback pulse to the semiconductor junction of said first amplifying means with a polarity to forward bias said semiconductor junction.

* * * * *